Figure 1:
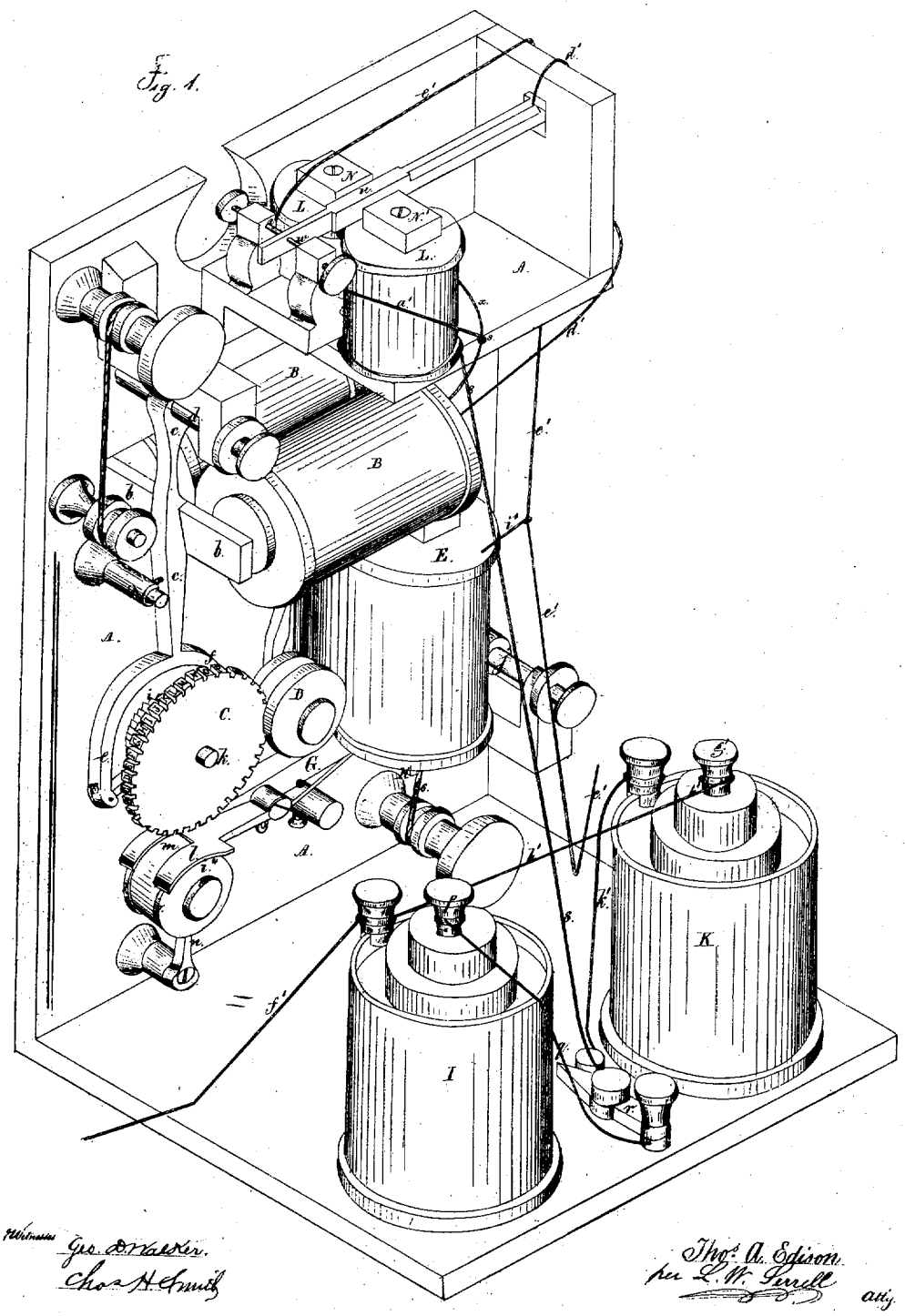

4 Sheets—Sheet 1.

T. A. EDISON.

PRINTING TELEGRAPH.

No. 4,166. Reissued Oct. 25, 1870.

Witnesses Geo. O. Walker. Chas. H. Smith

Thos. A. Edison. per L. W. Serrell atty.

THE NORRIS PETERS CO., PHOTO-LITHO., WASHINGTON, D. C.

T. A. EDISON.

PRINTING TELEGRAPH.

No. 4,166. Reissued Oct. 25, 1870.

Witnesses,

Geo. D. Walker

Chas. H. Smith

Thos. A. Edison.

per Lemuel W. Serrell atty

THE NORRIS PETERS CO., PHOTO-LITHO., WASHINGTON, D. C.

T. A. EDISON.

PRINTING TELEGRAPH.

No. 4,166. Reissued Oct. 25, 1870.

Witnesses,

Geo. D. Wacker.

Chas. H. Smith

Thos. A. Edison

Lemuel W. Serrell atty.

THE NORRIS PETERS CO., PHOTO-LITHO., WASHINGTON, D. C

T. A. EDISON.

PRINTING TELEGRAPH.

No. 4,166. Reissued Oct. 25, 1870.

Witnesses
Geo. D. Wacker.
Chas. H. Smith

Thos. A. Edison.
Lemuel W. Serrell
atty.

THE NORRIS PETERS CO., PHOTO-LITHO., WASHINGTON, D. C.

United States Patent Office.

THOMAS A. EDISON, OF NEWARK, NEW JERSEY, ASSIGNOR, BY MESNE ASSIGNMENTS, TO THE GOLD AND STOCK TELEGRAPH COMPANY.

Letters Patent No. 91,527, dated June 22, 1869; reissue No. 4,166, dated October 25, 1870.

IMPROVEMENT IN PRINTING-TELEGRAPHS.

The Schedule referred to in these Letters Patent and making part of the same.

*To all whom it may concern:*

Be it known that I, THOMAS A. EDISON, now of Newark, in the county of Essex and State of New Jersey, have invented an Improvement in Printing-Telegraphs; and the following is declared to be a correct description of the same.

This invention relates to a printing-telegraph in which an electro-magnet is employed for setting the type-wheel by a step-by-step movement, and another magnet is used for giving the impression upon the strip of paper; the special feature of my invention consisting in the combination of the foregoing parts with a circuit-changer actuated by the polarity of the current, so that the instrument at the receiving-station is under the control of the operator at the transmitting-station, and, when pulsations of one polarity are sent, the circuit-changer causes said pulsations to operate to set the type-wheel, the printing-magnet and its branch-circuit being cut out; and, when a pulsation of the opposite polarity is sent, the circuit-changer is moved so that the branch-circuit to the printing-magnet is closed and the circuit to the type-wheel magnet is rendered inoperative. By this means one wire may be used for operating the printing-telegraph, and several machines in one main line may be simultaneously operated, and no attendants are required at the receiving-stations; weights, springs, and clock-work are not required, and each current acts with its full force upon the electro-magnet to which it is directed in the branch-circuit, so that local batteries or relay-magnets are rendered unnecessary.

I also make use of a double-acting escapement with a type-wheel printing-mechanism and electro-magnet, operated by the main circuit, whereby both the breaking and closing-stroke of the armature assist in the movement of the type-wheel.

In the drawing—

A represents the frame of the apparatus, to which is attached an electro-magnet, B B, of the usual construction.

C is a type-wheel, whose periphery is provided with suitable letters or other characters, which revolve upon a stud or shaft, *k*.

The armature *b* of the electro-magnet B is attached to a lever, *c*, suspended upon an arbor *d*.

Figure 2:
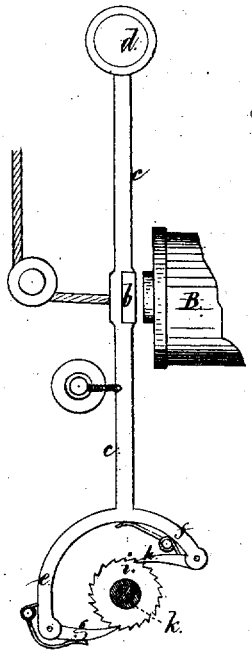

The lower end of the lever *c* is bifurcated, as seen in Figures 1 and 2, the two arms *e f* carrying pawls *g h*, which engage at opposite points upon the periphery of the ratchet-wheel *i*, which is fixed upon the same shaft as the type-wheel C, and revolves with it.

It will be understood, by reference to fig. 2, that each vibration of the lever *c* backward or forward will cause the ratchet-wheel *i* to advance in its revolution the distance of one tooth in the same direction.

The type-wheel C receives its supply of ink from the roller D in any well-known manner.

The electro-magnet E is similar to the electro-magnet B, and is attached to the frame A.

Figure 3:
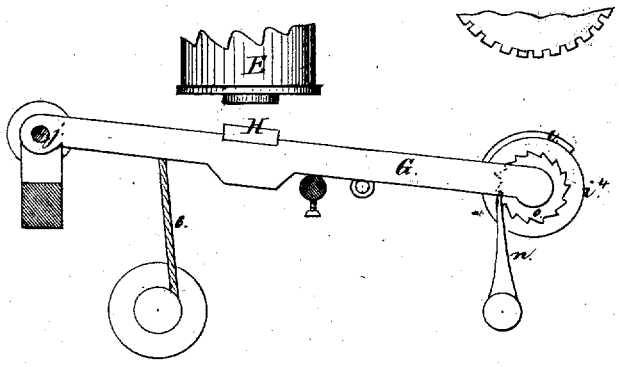

The armature H, Figure 3, is attached to the lever G, figs. 1 and 3, which swings upon its axis at *j*, and is provided at its opposite extremity with a roller, $i^4$, which occupies a position immediately beneath the type-wheel C.

The strip of paper upon which the communications are to be printed is led from a suitable reel, not shown, over the roller $i^4$, upon which it is held with a sufficient degree of friction by a spring-arm, *l*, provided with an open slot, *m*, so that, when the roller $i^4$ is raised by the action of the electro-magnet E upon the lever G, the strip of paper is brought in contact with whatever letter or character may at that time be opposite upon the type-wheel C, thereby printing the impression of said letter or character upon the paper.

When the action of the electro-magnet E ceases, the lever G is drawn back to its original position by a spring, 6.

After each impression has been made, the strip of paper is moved forward by means of a pawl, *n*, which, when the lever G is drawn back, engages with the teeth of a ratchet-wheel, *o*, fig. 3, which is secured to the roller $i^4$, causing the said roller to revolve and draw the paper forward a sufficient distance to produce the required space between the letters.

The edges 7 of the roller $i^4$, are roughened to prevent the paper from slipping during the movement.

The arrangement of the electrical connections, and the manner in which either of the electro-magnets B or E may be operated while the other is caused to remain inactive, will now be described, reference being had particularly to Figures 1, 4, and 5.

I and K are two voltaic batteries, which may be of any suitable construction. The positive pole of the battery I and the negative pole of the battery K are shown as connected to ground or earth-wires *f' h'*, and their opposite poles to a key, *r*, which is so arranged that either the positive pole of K or the negative pole of I may be placed in connection with the line-wire *s* at pleasure.

The apparatus just described is supposed to be situated at the transmitting-station, and the line-wire *s* to extend to the receiving-station where the printing-apparatus is supposed to be placed.

The arrangement of the connection at the receiving-station is as follows:

L is a small electro-magnet, with a circuit-changer or permanently-magnetized bar, *u*, pivoted in such a position that one of its extremities is free to vibrate as acted upon by the poles N N' of the electro-magnet L, its movement, however, being limited by the contact-screws *v* and *w*.

The circuit-changer or bar *u* is to be made of magnetized steel or of soft iron, of a character to be moved by the change in the polarity of the electro-magnet.

By a well-known law of magnetic action, when an electric current passes through the helices of the electro-magnet L, the bar *u* will be attracted by one of its poles and repelled by the other; and when the said current is reversed, or, in other words, changed from positive to negative, or from negative to positive, the bar will be attracted by the opposite pole, and repelled by the pole which in the first place attracted it.

The manner in which this action is applied to the operation of the apparatus will now be explained.

Figure 4:
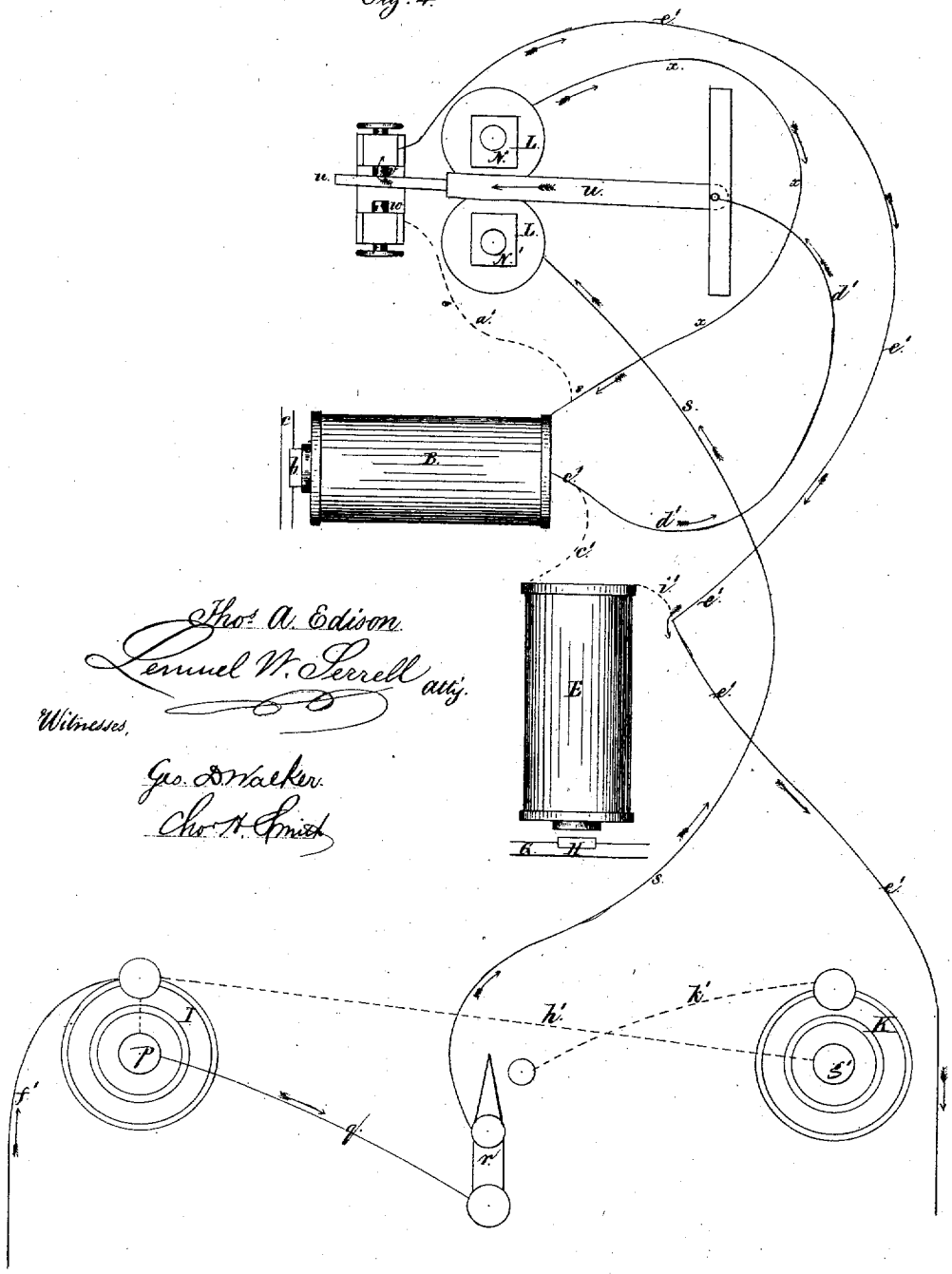

Referring to fig. 4—

Suppose the battery I to be placed in connection with the line wire *s*, by means of the key *r*, the current from the negative pole *p* passes, as indicated by the arrows, by the wire *q* to the key *r*, thence by the line wire *s*, through the electro-magnet L, thence by wire *x* to the point 8, where a branch, *a*, goes to the contact point *w*; but as the circuit is interrupted at this point, the current goes through the electro-magnet B, which actuates the type-wheel.

After passing through B two routes are open to the current, one by wire *c'*, electro-magnet E, and wire *i'*, and the other by wire *d'*, bar or "switch" *u*, contact point *v*, and wire *e'*.

As the latter route offers a very small resistance compared with that through E, the current will take this route in preference, as shown by the arrows, and the electro-magnet E will remain inoperative.

The circuit, after being completed as above described, may be alternately broken and closed by means of an ordinary transmitter, (not shown,) for the purpose of operating the armature *b*, and thereby rotating the type-wheel C, the mechanism connected with which is so arranged that the circuit requires to be closed and broken once in order to move the wheel C a distance equal to that between two successive letters or characters.

This insures the circuit being open whenever a letter is brought into position to allow of its impression being taken off upon the strip of paper.

Figure 5:
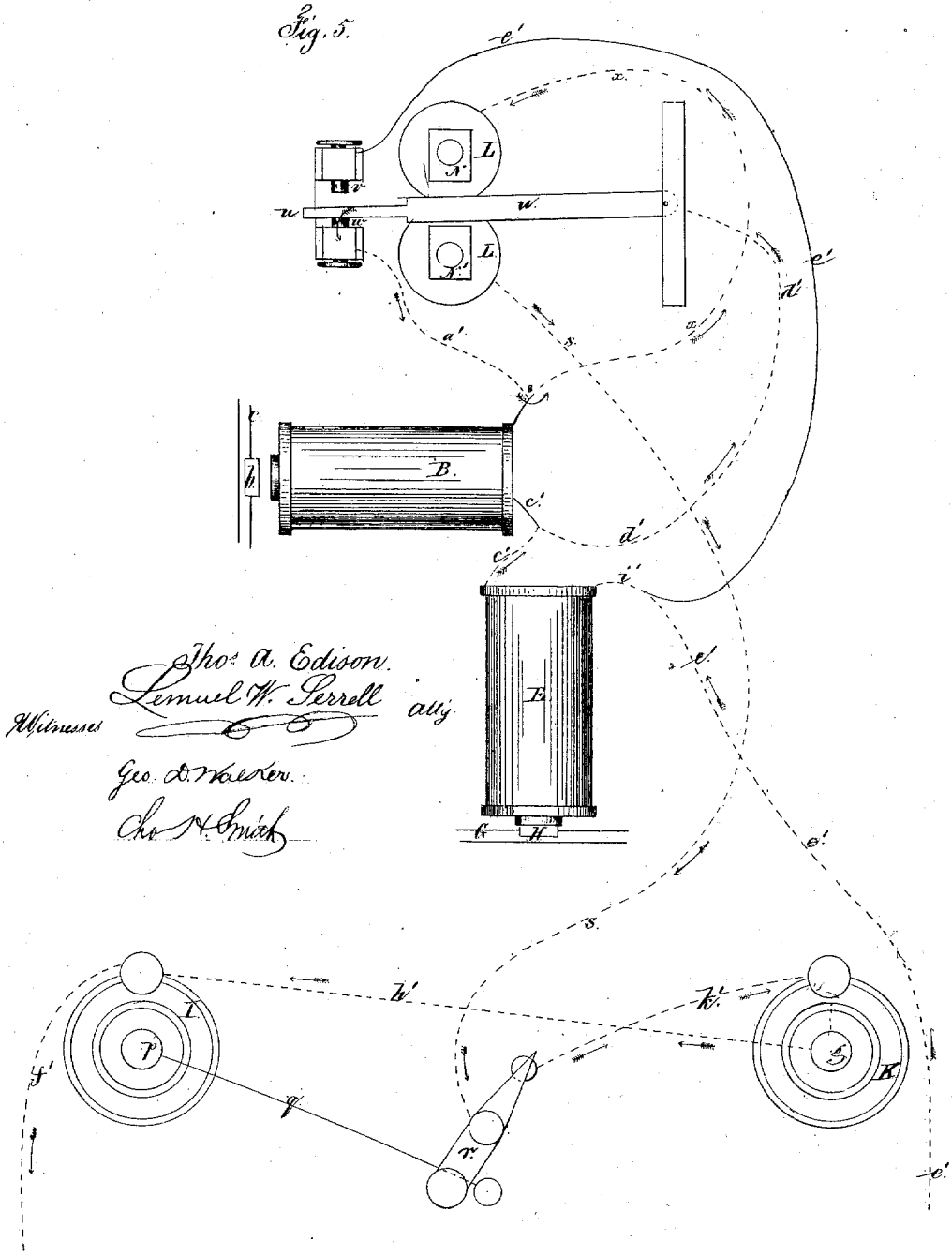

When the type-wheel has been rotated (by operating the transmitter) until the desired letter or character has been brought into position opposite the roller $i^4$, the current is reversed by shifting the key *r* into the position shown in fig. 5, which disconnects the battery I and causes the current from the positive pole *g'* of the battery K to pass through the line wire *s*.

Upon reaching the receiving-station it will for an instant take the same course as before, but its action upon the electro-magnet L being reversed, the bar or circuit-changer *u* will be attracted to its opposite pole so as to come in contact with the point *w*, instead of the point *v*, as in fig. 5.

The action of an electro-magnet upon a polarized or permanently-magnetic bar being much quicker than upon an ordinary armature of soft iron, the lever *u* will be shifted from the point *v* to the point *w* before the electro-magnet B has time to act.

As soon as the bar or circuit-changer *u* comes in contact with the point *w*, the current will pass, as indicated by the dotted lines and arrows, fig. 5, by the wires *h' f' e' i'* to the electro-magnet E of the printing-hammer, and thence (instead of passing through the electro-magnet B) by the shortest course through the wires *c' d'* to the tongue *u*, thence by the contact-pin *w* and wires *a' x* to the electro-magnet L, and by the wire *s*, key *r*, and wire *k'*, to the zinc-pole of the battery K, completing the circuit, and causing the armature H to be attracted to the magnet E, raising the lever G, and bringing the paper into contact with the letter on the type-wheel as required.

The key *r* is then moved back into position, seen in figs. 1 and 4, which again reverses the current and causes it to take the course first described through the electro-magnet B of the type-wheel, but not through the electro-magnet E, the armature of which ceases to be attracted, when the lever G, with the roll *i*, is drawn down by the spring 6, and the paper fed forward to receive the next impression, as required, when the operation continues as before.

It will thus be seen that by the employment of a circuit-changer, as above described, either one of the electro-magnets B or E may be brought into action, and the other cut out of the circuit at pleasure, by the reversal of the current, which enables me to greatly simplify the construction of printing telegraphs, and reduce their cost.

The above-described invention is designed particularly for transmitting intelligence from a central station to a number of receiving stations included in the circuit, in which case no batteries or operators will be required at the receiving station; but if messages are to be sent from each station, as well as received, then each instrument will require to be provided with a transmitting-instrument, a battery, and an ordinary switch, connected with a ground wire.

I claim as my invention—

1. A circuit-changer, in combination with an electro-magnet and the type-wheel, and an electro-magnet and the printing mechanism, substantially as set forth, whereby the current is directed through either magnet, according to the polarity of the current, substantially as set forth.

2. A polarized bar, permanent magnet or circuit-changer, and an electro-magnet to move the same, in combination with an electro-magnet placed in the same circuit, and brought into or thrown out of that circuit, according to the polarity of the current and the consequent position of the said permanent magnet, substantially as set forth.

3. The combination of a polarized bar or circuit-changer with two electro-magnets, operated by a main circuit, substantially as specified, whereby either of the two electro-magnets may be brought into action at pleasure, by the use of a positive or a negative current, the other electro-magnet being at the same time inoperative, substantially as set forth.

4. Two or more printing telegraph instruments placed in one main circuit, and operated simultaneously by pulsations of electricity, the type-wheel being set by pulsations of one polarity, and the printing being effected by pulsations of the opposite polarity, substantially as set forth.

Dated this 6th day of September, A. D. 1870.

THOMAS A. EDISON.

Witnesses:

CHAS. H. SMITH,

GEO. T. PINCKNEY.